United States Patent
Cho et al.

(10) Patent No.: US 9,807,338 B2
(45) Date of Patent: Oct. 31, 2017

(54) IMAGE PROCESSING APPARATUS AND METHOD FOR PROVIDING IMAGE MATCHING A SEARCH CONDITION

(71) Applicant: Hanwha Techwin Co., Ltd., Changwon-si (KR)

(72) Inventors: Sung Bong Cho, Changwon-si (KR); Sung Hoon Lee, Changwon-si (KR); Seok Ho Chae, Changwon-si (KR); Hyo Jin Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/036,945

(22) PCT Filed: Mar. 25, 2014

(86) PCT No.: PCT/KR2014/002484
§ 371 (c)(1),
(2) Date: May 16, 2016

(87) PCT Pub. No.: WO2015/072631
PCT Pub. Date: May 21, 2015

(65) Prior Publication Data
US 2016/0295157 A1  Oct. 6, 2016

(30) Foreign Application Priority Data

Nov. 15, 2013  (KR) .................. 10-2013-0139332

(51) Int. Cl.
*H04N 5/76*  (2006.01)
*H04N 5/91*  (2006.01)
(Continued)

(52) U.S. Cl.
CPC .......... *H04N 5/91* (2013.01); *G06F 17/30256* (2013.01); *G06F 17/30268* (2013.01);
(Continued)

(58) Field of Classification Search
CPC .......... H04N 7/18; H04N 7/181; H04N 7/188; H04N 21/23418; G06K 9/00335; G06K 9/00771; G08B 13/19608
(Continued)

(56) References Cited

U.S. PATENT DOCUMENTS

2004/0218058 A1* 11/2004 Yamaguchi ............. G06T 11/60
                                                      348/218.1
2007/0188596 A1* 8/2007 Kenoyer ........... H04L 29/06027
                                                      348/14.08
(Continued)

FOREIGN PATENT DOCUMENTS

KR  10-2009-0079722 A   7/2009
KR  10-2011-0121056 A   11/2011
(Continued)

OTHER PUBLICATIONS

International Search Report dated Aug. 11, 2014, issued by the International Searching Authority in counterpart International Application No. PCT/KR2014/002484 (PCT/ISA/210).
(Continued)

*Primary Examiner* — Kelly L Jerabek
(74) *Attorney, Agent, or Firm* — Sughrue Mion, PLLC

(57) ABSTRACT

An image processing apparatus includes a storage storing images received from at least one camera, an image analyzer analyzing the images received from the at least one camera, separating an object, for which an event occurred, from a background, and extracting object properties information, a database storing the object properties information extracted with respect to each of the at least one camera, a search condition setter setting a search condition, a search engine searching the database for the object properties information matching the search condition, and obtaining image frames including the object properties information found from the
(Continued)

storage, and a file generator generating a single image file by synthesizing the image frames.

22 Claims, 10 Drawing Sheets

(51) Int. Cl.
- *G06F 17/30* (2006.01)
- *H04N 5/77* (2006.01)
- *H04N 9/804* (2006.01)
- *G06T 5/50* (2006.01)
- *G06T 7/10* (2017.01)
- *G06T 7/194* (2017.01)

(52) U.S. Cl.
CPC .......... *G06F 17/30867* (2013.01); *G06T 5/50* (2013.01); *G06T 7/10* (2017.01); *G06T 7/194* (2017.01); *H04N 5/77* (2013.01); *H04N 9/8047* (2013.01); *G06T 2207/20221* (2013.01)

(58) Field of Classification Search
USPC ................ 348/135, 143, 222.1, 231.2, 231.3
See application file for complete search history.

(56) References Cited

U.S. PATENT DOCUMENTS

| | | | |
|---|---|---|---|
| 2009/0245573 A1* | 10/2009 | Saptharishi | G06K 9/00771 382/103 |
| 2011/0025873 A1* | 2/2011 | Wang | G06F 17/30247 348/222.1 |
| 2011/0096149 A1 | 4/2011 | Au et al. | |
| 2011/0102627 A1* | 5/2011 | Okada | H04N 5/772 348/222.1 |
| 2012/0120248 A1* | 5/2012 | Han | H04N 7/18 348/169 |
| 2013/0201359 A1* | 8/2013 | Wu | H04N 5/23219 348/222.1 |
| 2013/0329059 A1* | 12/2013 | Uchikoshi | G06F 3/005 348/207.1 |
| 2014/0211017 A1* | 7/2014 | Argue | H04N 7/18 348/150 |

FOREIGN PATENT DOCUMENTS

| | | |
|---|---|---|
| KR | 10-1221542 B1 | 1/2013 |
| WO | 2010/013968 A2 | 2/2010 |
| WO | 2011/136418 A1 | 11/2011 |
| WO | 2012/033343 A2 | 3/2012 |
| WO | 2013/129726 A1 | 9/2013 |
| WO | 2013/165048 A1 | 11/2013 |

OTHER PUBLICATIONS

Written Opinion dated Aug. 11, 2014, issued by the International Searching Authority in counterpart International Application No. PCT/KR2014/002484 (PCT/ISA/237).
Communication dated Jun. 7, 2017 by the European Patent Office in counterpart European Patent Application No. 14862879.5.
Arun Hampapur et al., "Searching Surveillance Video," 2007 IEEE Conference on Advanced Video and Signal Based Surveillance, AVSS 2007, Sep. 5-7, 2007, London, UK, pp. 1-6 (Total 6 pages), XP055321785.
Mulligatawny et al., "Group of pictures," Wikipedia, the free encyclopedia, Oct. 19, 2013, Total 2 pages, retrieved from the Internet: URL: https://en.wikipedia.org/w/index.php?title=Group of pictures&oldid=577808557 [retrieved on May 23, 2017].

* cited by examiner

FIG. 4B

FILE GENERATION PROGRESS RATE ▬▬▬▬▭▭▭▭

TIME: xx YEAR xx MONTH xx DAY xx HOUR xx MINUTE –
yy YEAR yy MONTH yy DAY yy HOUR yy MINUTE
OBJECT SEARCH CONDITION : xx

| NO. | CAMERA | FILE GENERATION STATE |
|---|---|---|
| 1 | FIRST CAMERA | COMPLETED |
| 2 | SECOND CAMERA | 30% |
| 3 | THIRD CAMERA | STANDBY |
| 4 | FOURTH CAMERA | STANDBY |
| 5 | FIFTH CAMERA | STANDBY |
| 6 | SIXTH CAMERA | STANDBY |
| 7 | SEVENTH CAMERA | STANDBY |
| 8 | EIGHTH CAMERA | STANDBY |

◄ 1/2 ►

[Ok] [Cancel]

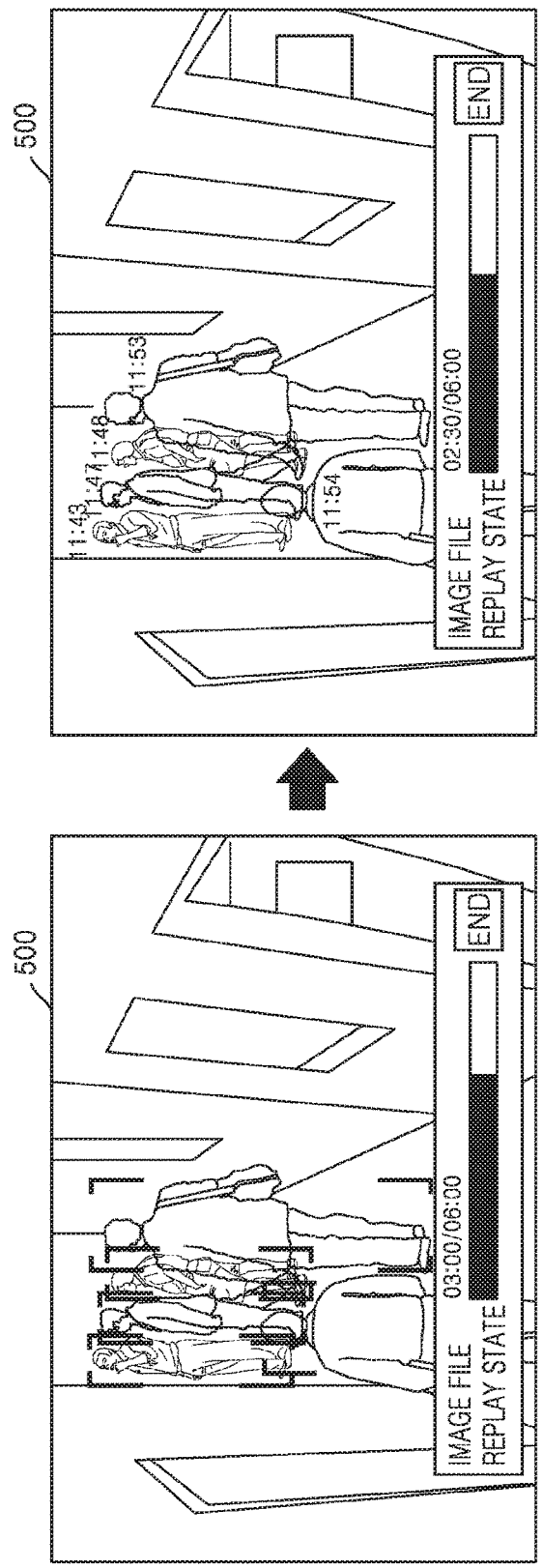

IMAGE PROCESSING APPARATUS AND METHOD FOR PROVIDING IMAGE MATCHING A SEARCH CONDITION

TECHNICAL FIELD

The present invention relates to an apparatus and method of processing an image, by which a single image file is generated by extracting, from a storage device storing images captured by at least one camera, an image frame of an image captured by each camera, the image frame satisfying a search condition.

BACKGROUND ART

Image recording and storing apparatuses such as digital video recorders or network video recorders are connected to monitoring cameras and store images of a monitoring area as captured by the monitoring cameras.

The image recording and storing apparatus records all images captured by the monitoring cameras without any separate processing. Recently, as a technology to recognize and track an object through image analysis has been developed, an image of a recognized and tracked object can be stored.

However, when it is desired to check an image of a particular object from the images stored in the image recording and storing apparatus, it is a problem to search all recorded image information.

A search time may be reduced if a time and place where the particular object appears is known. Otherwise, lots of time and efforts are necessary to search for the particular object.

DETAILED DESCRIPTION OF THE INVENTION

Technical Problem

The present invention provides an apparatus and method of processing an image, by which a fast search for a desired object is facilitated by generating a single image file by extracting, from a storage device storing images captured by at least one camera, an image frame of an image captured by each camera, the image frame satisfying a search condition.

Technical Solution

According to an aspect of the present invention, there is provided an image processing apparatus includes a storage storing images received from at least one camera, an image analyzer analyzing the images received from the at least one camera, separating an object, for which an event occurred, from a background, and extracting object properties information, a database storing the object properties information extracted with respect to each of the at least one camera, a search condition setter setting a search condition, a search engine searching the database for the object properties information matching the search condition, and obtaining image frames including the object properties information found from the storage, and a file generator generating a single image file by synthesizing the image frames.

The storage may store real-time images received from the at least one camera or previously stored images.

The search condition setter may include a camera setter selecting the at least one camera, an object setter setting at least one of object properties information of the object appearing in the images captured by the at least one camera, and a time setter setting a time range when the object appears.

The image processing apparatus may further include a region setter setting at least one region where the object appears in the images captured by the at least one camera.

The search engine may obtain image frames including the object properties information among image frames included in a group of pictures (GOP) stored in the storage, and when an image frame including the object properties information is a predicted (P) frame, an intra (I) frame may be obtained together with the P frame.

The file generator may generate a compressed image file by compressing the image frames.

The search engine may search the database for the object properties information matching the search condition, and obtain object images including the object properties information found from the storage.

The file generator may synthesize the object images and a background image including the object images from the storage, and generate and compress a single image file.

The image processing apparatus may further include a replayer replaying the image file obtained by synthesizing the image frames.

The replayer may display object identification information to identify each of a plurality of objects displayed during replaying of the image file.

When an object is selected, the replayer may extract an original image of the object from the storage and replay an extracted original image in another region.

According to another aspect of the present invention, there is provided a method of processing an image, which includes storing images received from at least one camera, analyzing the images received from the at least one camera, separating an object, for which an event occurred, from a background, and extracting object properties information, establishing a database with the object properties information extracted with respect to each of the at least one camera, setting a search condition, searching the database for the object properties information matching the search condition, and obtaining image frames including the object properties information found from the stored images, and generating a single image file by synthesizing the image frames.

The images may be real-time images received from the at least one camera or previously stored images.

The setting of the search condition may include selecting the at least one camera, setting at least one of object properties information appearing in the images captured by the at least one camera, setting a time range when the object appears, and setting at least one region where the object appears in the images captured by the at least one camera.

The generating of the single image file may further include generating a compressed image file by compressing the image frames.

The searching for the object properties information and the obtaining of the image frames may further include searching the database for the object properties information matching the search condition, and obtaining object images including the object properties information found from the stored images.

The generating of the single image file may further include synthesizing the object images and a background image including the object images from the stored images, and generating and compressing a single image file.

The method may further include replaying the image file.

The replaying of the single image file may further include displaying object identification information to identify each of a plurality of objects displayed during replay of the image file.

The replaying of the single image file may further include, when an object is selected, extracting an original image of the object from the stored images and replaying the extracted original image in another region.

Advantageous Effects

According to the present inventive concept, since a single image file is created by extracting image frames for each camera satisfying a search condition from a storage storing images captured by at least one camera, a fast search for a desired object may be possible.

DESCRIPTION OF THE DRAWINGS

FIGS. 4A and 4B illustrate screens generating an image file according to search condition setting, according to an embodiment.

FIG. 6 illustrates image file replaying screens according to an embodiment.

BEST MODE

Figure 1:
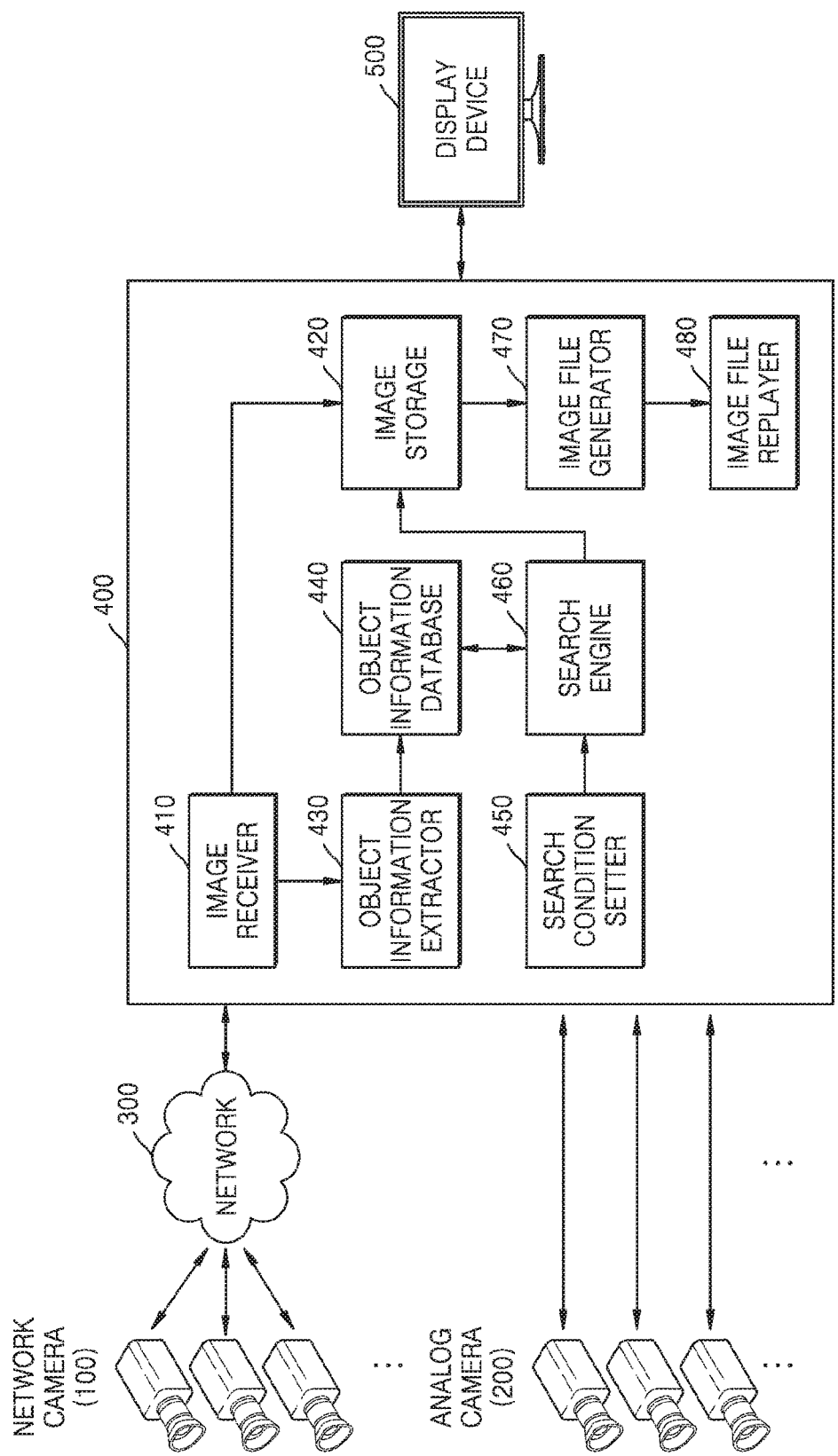
FIG. 1 is a block diagram of a structure of an image processing apparatus according to an embodiment.

An image processing apparatus includes a storage storing images received from at least one camera, an image analyzer analyzing the images received from the at least one camera, separating an object, for which an event occurred, from a background, and extracting object properties information, a database storing the object properties information extracted with respect to each of the at least one camera, a search condition setter setting a search condition, a search engine searching the database for the object properties information matching the search condition, and obtaining image frames including the object properties information found from the storage, and a file generator generating a single image file by synthesizing the image frames.

A method of processing an image includes storing images received from at least one camera, analyzing the images received from the at least one camera, separating an object, for which an event occurred, from a background, and extracting object properties information, establishing a database with the object properties information extracted with respect to each of the at least one camera, setting a search condition, searching the database for the object properties information matching the search condition, and obtaining image frames including the object properties information found from the stored images, and generating a single image file by synthesizing the image frames.

MODE OF THE INVENTION

The present inventive concept will now be described more fully with reference to the accompanying drawings, in which embodiments of the inventive concept are shown. Throughout the drawings, like reference numerals denote like elements. In the following description, when detailed descriptions about related well-known functions or structures are determined to make the gist of the present inventive concept unclear, the detailed descriptions will be omitted herein.

Terms such as "first" and "second" are used herein merely to describe a variety of constituent elements, but the constituent elements are not limited by the terms. Such terms are used only for the purpose of distinguishing one constituent element from another constituent element.

Terms used in the present specification are used for explaining a specific embodiment, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the inventive concept may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

FIG. 1 is a block diagram of a structure of an image processing apparatus according to an embodiment. Referring to FIG. 1, the image processing apparatus according to the present embodiment may include a plurality of network cameras 100, a plurality of analog cameras 200, a network 300, an image processing device 400, and a display device 500.

At least one of the network cameras 100 is installed in a certain area, and the at least one of the network cameras 100 outputs, via the network 300, captured images via a digital image signal to the image processing device 400 such as a digital video recorder or a network video recorder. The network cameras 100 may be speed dome cameras arranged at a fixed position in a particular place. Also, the network cameras 100 may include a single stationary camera having a fixed focus lens and a fixed capturing range or a pan-tilt-zoom (PTZ) camera having a variable capturing range. A single PTZ camera may easily monitor various monitoring areas by performing a pan operation of turning the PTZ camera in a horizontal direction, a tilt operation of turning the PTZ camera in a vertical direction, and a zoom-in/zoom-out operation.

At least one of the analog cameras 200 is installed in a certain area, and the at least one analog camera 200 outputs captured images via an analog image signal to the image processing device 400.

The image processing device 400 receives and stores images captured by the at least one of the network cameras 100 and the at least one of the analog cameras 200, performs image analysis by separating an object, for which an event occurred with respect to the captured images, from a background, and generating object properties information, that is, information about properties of an object, and generating a single image file by extracting image frames satisfying a search condition for the respective cameras. The image processing device 400 may include an image receiver 410, an image storage 420, an object information extractor 430, an object information database 440, a search condition setter 450, a search engine 460, an image file generating unit 470, and an image file replaying unit 480. The image processing device 400 is described below in detail with reference to FIG. 2.

The display device 500 replays an image file generated by the image processing device 400. The display device 500 may include at least one of a liquid crystal display (LCD), an organic light-emitting display (OLED), an electrophoretic display (EPD), a flexible display, a three-dimensional display (3D display).

Figure 2:
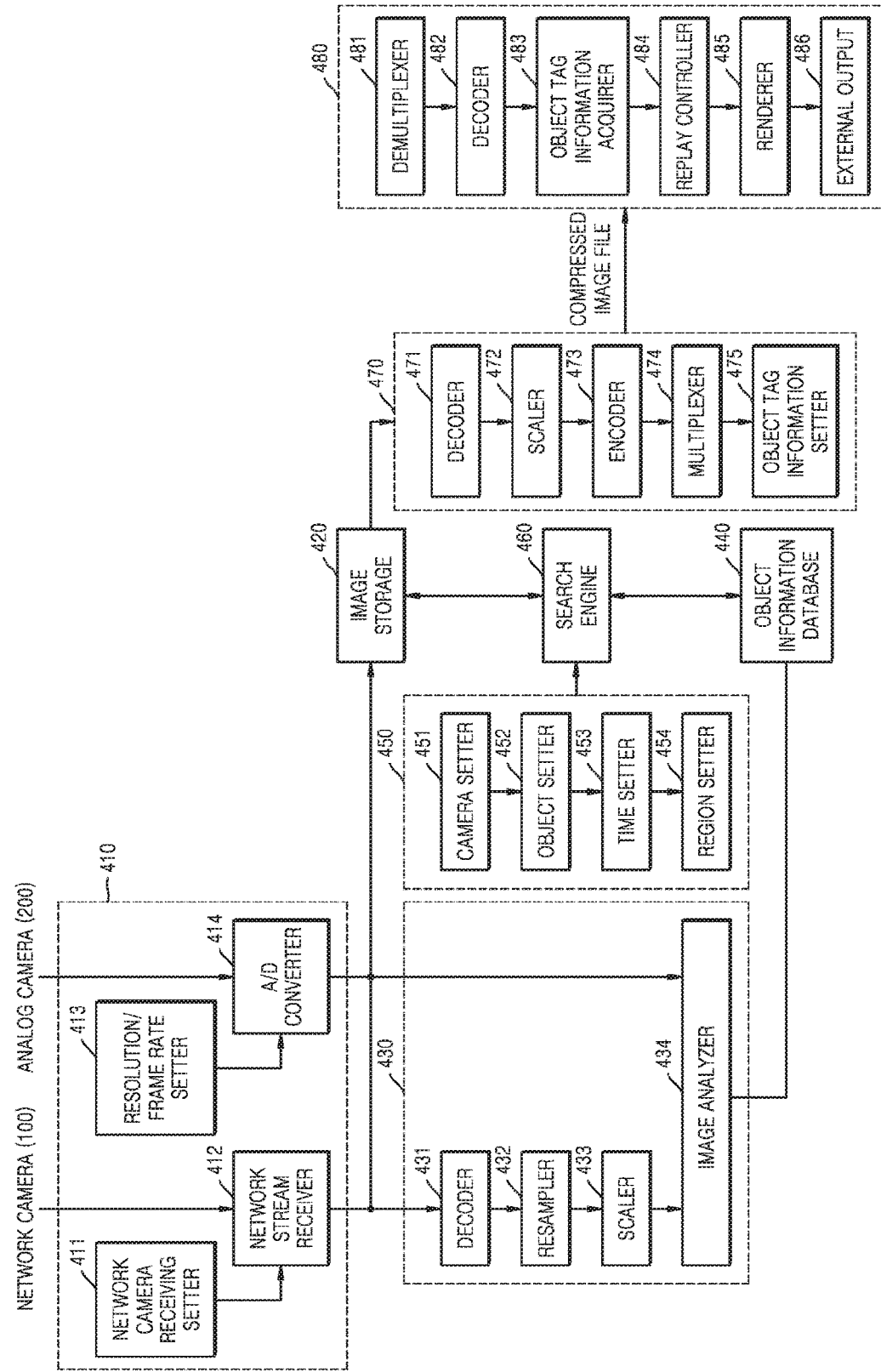
FIG. 2 is a block diagram of a structure of an image processing device of FIG. 1.

FIG. 2 is a block diagram of a structure of the image processing device 400 of FIG. 1.

Referring to FIG. 2, the image receiver 410 receives the images captured by at least one of the network cameras 100 and the at least one of the analog cameras 200. In order to receive the images captured by the network cameras 100, the image receiver 410 may include a network camera receiving setter 411 and a network stream receiver 412. The network camera receiving setter 411 may set a network address with respect to the at least one of the network cameras 100. The network stream receiver 412 receives encoded images captured by the at least one of the network cameras 100 having a set network address.

Also, the image receiver 410 may include a resolution and frame rate setter 413 and an analog-digital converter 414 to receive the images captured by the analog cameras 200. The resolution and frame rate setter 413 sets a resolution and a frame rate to convert an analog image signal to a digital image signal. The analog-digital converter 414 converts an analog image received from the at least one of the analog cameras 200 to a digital image based on a set resolution and a set frame rate.

In the present embodiment, although the image receiver 410 is described by being divided into a portion that receives the images of the network cameras 100 and a portion that receives the images of the analog cameras 200, the image receiver 410 may be configured to be a hybrid type that receives the images of the network cameras 100 and the images of the analog cameras 200 by mixing the images.

The image storage 420 stores the images of the network cameras 100 and the digitally converted images of the analog cameras 200, which are received by the image receiver 410. The image storage 420 stores the images of the network cameras 100, as an encoded stream, and the digitally converted images of the analog cameras 200 by encoding the digitally converted image. The image storage 420 may store by dividing a camera receiving each image and an image receiving time.

The object information extractor 430 extracts the information of properties of an object, for which an event occurred, by analyzing the images of the network cameras 100 and the digitally converted images of the analog cameras 200, which are received by the image receiver 410. The object information extractor 430 may include a decoder 431, a resampler 432, and a scaler 433, which perform a pretreatment process to analyze the images captured by the network cameras 100. The decoder 431 decodes the encoded images of the network cameras 100. The resampler 432 converts a frame rate of a decoded image to a certain frame rate for image analysis. The scaler 433 converts a resolution of the decoded image to a certain resolution for image analysis. The images of the network cameras 100 and the digitally converted images of the analog cameras 200, which are converted as above, are input to an image analyzer 434.

The image analyzer 434 performs an image analysis algorithm to analyze object information with respect to the images of the network cameras 100 and the digitally converted images of the analog cameras 200, determines occurrence of an event by detecting a movement from an image input by each camera, separates an object, for which an event occurred, from a background, and extracts object classification information and object attributes information from the object, for which an event occurred. The object classification information may include a person, a vehicle, or an animal, for which a movement thereof occurred, whereas the object attributes information may include a color of an object, a size of an object, area information, the number of vehicle, or characters.

When the object classification information and the object attributes information are extracted for each camera, that is, any one of the at least one of the network cameras 100 and the at least one of the analog cameras 200, the image analyzer 434 assigns identification (ID) information to the object, and stores the object classification information and object attributes information including the ID information, camera information, and object appearance time, etc. in the object information database 440.

Information about a movement of an object occurring in an image of each camera, the object classification information and the object attributes information, and the object properties information including stored image information are recorded and stored in the object information database 440. The object properties information is stored by being classified such that the same object or a similar object may be searched for in the images captured at the same time or different times by different cameras. For example, when a certain person (object) entered a certain building are captured at the same time by several cameras, object properties information obtained from a result of analysis of the images captured by the respective cameras may be stored in the object information database 440. Also, when the object are captured by different cameras at different time points according to a movement of the object, the object properties information obtained from a result of analysis of the images captured by the respective cameras may be stored in the object information database 440. Information for identifying that the object is the same object may be additionally stored in the object information database 440.

The search condition setter 450 sets an image search condition for generating an image file. The search condition setter 450 may include a camera setter 451, an object setter 452, a time setter 453, and a region setter 454. The search condition setter 450 may select at least one of a camera, an object, time, and a region.

The camera setter 451 selects at least one camera of the at least one of the network cameras 100 and the at least one of the analog cameras 200. When the selecting of a camera is completed, the image storing device 400 receives only images captured by the selected camera.

The object setter 452 may set a certain object. The setting of an object may be performed by using an input device such as a mouse (not shown) while watching a displayed image. Alternatively, the object may be directly input by using a keyboard (not shown). For example, at least one of a person, a vehicle, and an animal may be set to be an object. Furthermore, the object setter 452 may set an object including the object attributes information. For example, at least one of a yellow car, a person in red clothes, a car plate, and a particular character may be set.

The time setter 453 may set a time for image searching. For example, time setting by minutes, hours, days, months, or years may be possible.

Figure 5A:
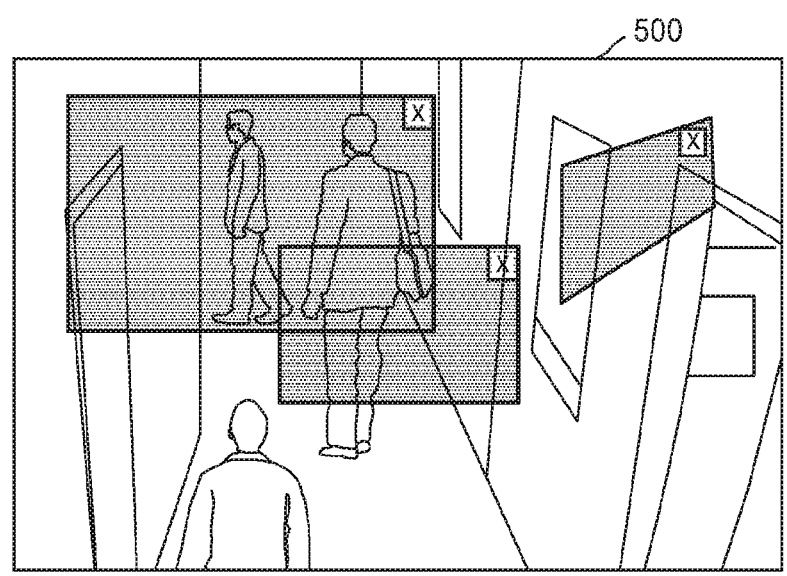
FIGS. 5A and 5B illustrate screens replaying an image file according to search condition setting, according to an embodiment.

The region setter 454 may set at least one region for generating an image file by using an input device such as a mouse while a displayed image is watched. For example, FIG. 5A illustrates that three regions are set in a displayed image.

The search condition setter 450 may set a search condition with respect to an image that is input in real time and an image that is previously stored. In other words, the image processing apparatus according to the present embodiment may be operable with respect to both of the real-time image and the previously stored image.

The search engine 460 searches the object information database 440 for the object properties information matching the search condition, and obtains image frames including the object properties information found from the image storage 420.

The search engine 460 obtains image frames including the object properties information among intra (I) frames, predicted (P) frames, and bidirectional (B) frames included in a group of pictures (GOP) stored in the image storage 420. An I frame is a key frame that is an independent frame compressed without referring to previous frames and has the best image quality and the largest size among the frames. A P frame is obtained based on information of a previous I frame or a previous P frame and has an intermediate image quality and size. The P frame is obtained by compressing a changed content only by referring to a previous I frame or a previous P frame. The I frame and the P frame are used as reference frames for next other frames. A B frame has the lowest image quality and size among the frames and requires reference frames before and after the frame, that is, the I frame and the P frame, for compression. When an image frame including the object properties information is a P frame, the search engine 460 obtains an I frame together.

The image file generator 470 generates an image file by using the image frames obtained from the image storage 420 through the search by the search engine 460. The image file generator 470 generates a single compressed image file by compressing the image frames. The image file generator 470 arranges the obtained image frames in order of time and compresses the arranged image frames into a single image file. When image frames including the object properties information are obtained from at least one camera set to the same time, the image file generator 470 generates a compressed file by interleaving different image frames in a single image file. Also, the image file generator 470 may generate a single image file by synthesizing object images matching the search condition, which the search engine 460 obtains from the image storage 420, and a certain background image including the object images obtained from the image storage 420 and compress the single image file. The cameras selected to generate an image file may have different background images. In this case, the image file may be generated by obtaining a background image matching an image of the obtained object. Then, when the image file is replayed later, the object and the background are replayed overlapping each other.

As such, the image file generator 470 may perform video compression by compressing the image frames including the object properties information and/or object video compression by obtaining object images matching the search condition, synthesizing the obtained object images with a certain background image, and compressing the synthesizes images.

The image file generator 470 may include a decoder 471, a scaler 472, an encoder 473, a multiplexer 474, and an object tag information setter 475. The decoder 471 decodes the encoded image frames obtained from the image storage 420. The scaler 472 converts resolutions of the image frames to the same resolution when the resolutions of the obtained image frames are different from one another. The encoder 473 encodes again the image frames, of which resolutions are converted to the same resolution. Also, the encoder 473 encodes object images matching the search condition and a certain background image including the object image. The multiplexer 474 synthesizes the encoded frames into a single stream. The object tag information setter 475 set such that information about a camera capturing an image of the object and information about a time when the image is captured and the object properties information, that is, object tag information, are included in each compressed image frame.

The image file replayer 480 replays the compressed image file on the display device 500. When the compressed image file is replayed on the display device 500, a user may control replay, pause, forward replay, and reverse replay. Also, when the compressed image file is replayed on the display device 500, the objects included in the replayed image frame may be replayed overlapping one another. To identify the objects, the objects may be displayed with first identification information such as a marker on the outside of an object. Also, an object may be selected from a replayed image file. When a certain object is selected, second identification information including the information about a camera that captures an image of the object, the time information and the object properties information may be displayed altogether. Also, when a certain object is selected from a replayed image file, an original image file in which the selected object is captured may be replayed in another region of the display device 500. In this case, a replay time of the original image file is moved to a time point when the selected object appears and thus the original image file may be replayed from the time point.

The image file replayer 480 may include a demultiplexer 481, a decoder 482, an object tag information acquirer 483, a replay controller 484, a renderer 485, and an external output 486. The demultiplexer 481 separates the image frame information, the camera information and the time information, and the object properties information, from the image file. The decoder 482 decodes separated image frames. The object tag information acquirer 483 obtains the separated camera information and time information, and the object properties information, that is, the object tag information. The object tag information may be the second identification information that is displayed on the object selected by the user later. The replay controller 484 performs an overall control over the replay of an image. When an image is replayed on the display device 500, the replay controller 484 may receive and perform functions of pause, forward replay, and reverse replay according to a user's input. When the first or second identification information is displayed on the object and a certain object is selected, the replay controller 484 replays the original image file, in which the selected object is captured, in another region of the display device 500. The renderer 485 performs a series of processes to replay the image file corresponding to specifications of the display device 500. The external output 486 may output the image file to an external storing device (not shown).

Figure 3:
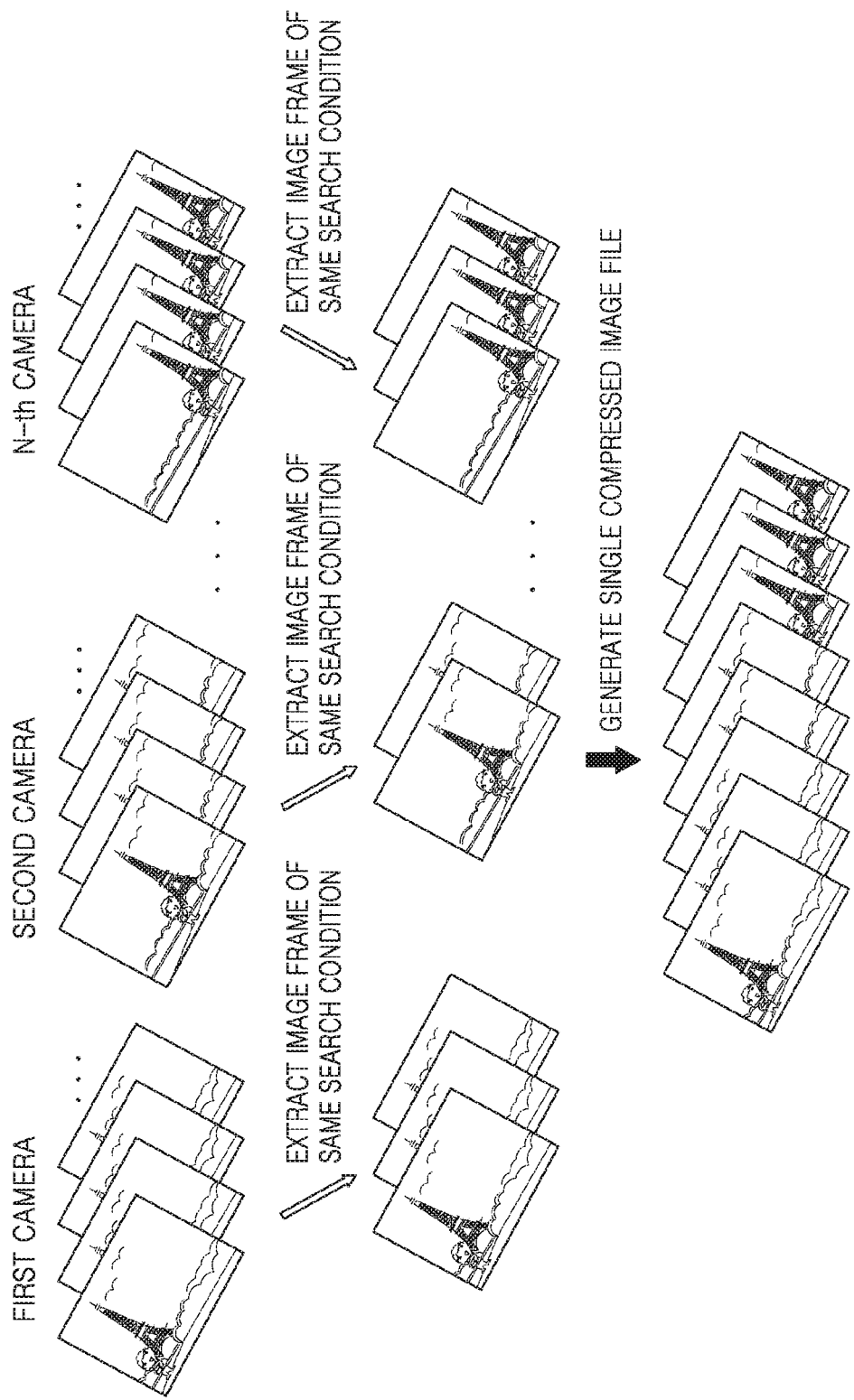
FIG. 3 illustrates a process of generating a single image file by extracting image frames satisfying a search condition, according to an embodiment.

FIG. 3 illustrates a process of generating a single image file by extracting image frames satisfying a search condition, according to an embodiment. Referring to FIG. 3, in a process (a), a first camera to an N-th camera are set as a search condition, and image frames captured by the first camera to the N-th camera are displayed. The image framed captured by the first camera to the N-th camera may be the real-time image frames or the previously stored image frames. In a process (b), at least one of an object, time, and a region is set as a search condition, and image frames matching the search condition are extracted from the image frames captured by the first camera to the N-th camera. In a process (c), the image frames matching the search condition and extracted from the image frames captured by the first camera to the N-th camera are generated in a single image file. The image file may be a compressed image file.

Figure 4A:
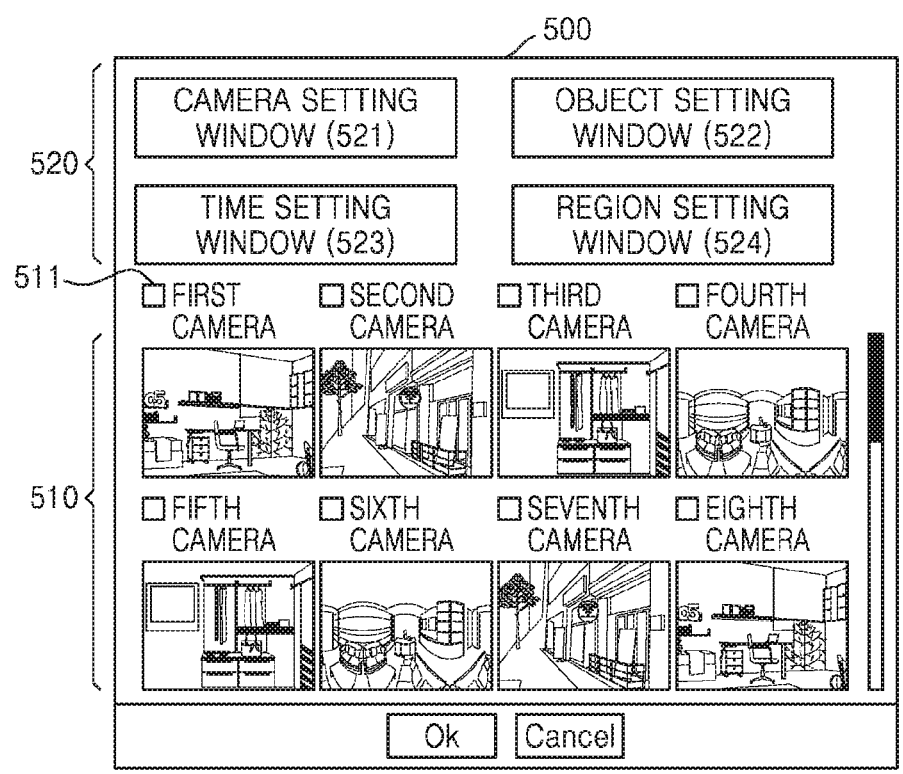

FIGS. 4A and 4B illustrate image file generation screens according to search condition setting, according to an embodiment. Referring to FIG. 4A, an image display area 510, in which camera images are displayed, and a search condition setting area 520 are displayed on the display device 500. The camera setting for generating an image file may be made by selecting a camera checkbox 511 displayed in the image display area 510 or by using a camera setting window 521 displayed in the search condition setting area 520. Also, an object, time, and a region may be set by selecting at least one of an object setting window 522, a time setting window 523, and a region setting window 524. When the entire setting is completed, a complete (OK) button is input.

FIG. 4B illustrates an example in which a file generation progress state after the input of the complete (OK) button is displayed on the display device 500. The time information and the object information input as a search condition to generate an image file are displayed, and a file generation state is displayed for each selected camera. A file generation progress rate shows a total progress rate and a progress rate for each camera together.

Figure 5B:
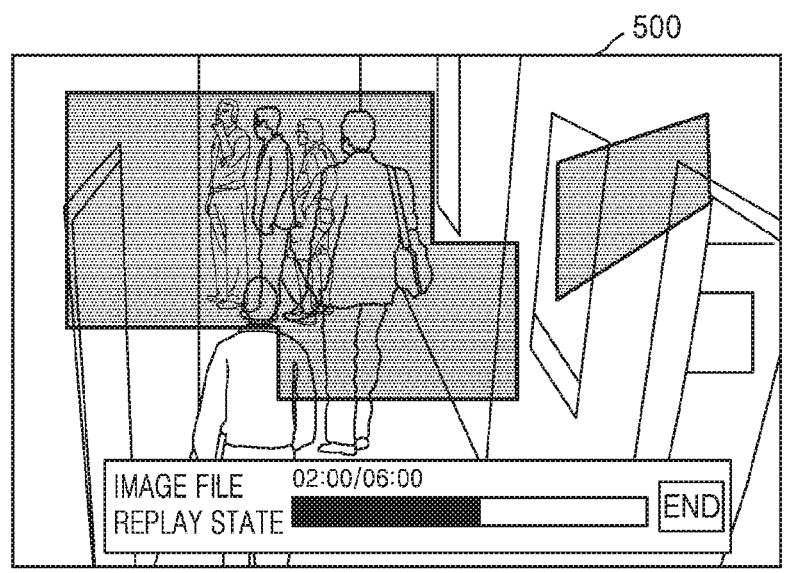

FIGS. 5A and 5B illustrate image file replay screens according to search condition setting, according to an embodiment. Referring to FIG. 5A, while a selected camera image is displayed, region setting for generating an image file is shown. The region setting may be performed by dragging or clicking mouse. Then, whether to use a set region as an interest region for generating an image file or an exclusive region may be selected. FIG. 5B illustrates an example in which an image file generated as the set region is selected to be an interest region is displayed. The exclusive region may be deleted and not replayed, or may be replayed together. Also, an image file replay state may be display together.

FIG. 6 illustrates image file replay screens according to an embodiment. Referring to FIG. 6, a left image illustrates an example in which an image file including a plurality of objects is replayed on the display device 500 and each of the objects in the image file is indicated with the first identification information (marker). Since a single image file is generated by extracting image frames matching a search condition from the images captured by at least one camera, objects captured by other cameras at the same time may be replayed overlapping one another. Accordingly, the first identification information may also be indicated overlapping each object.

In FIG. 6, a right image illustrates an example in which an image file including a plurality of objects is replayed on the display device 500 and each of the objects in the image file is indicated with the second identification information (object appearance time information). Since a single image file is generated by extracting image frames matching a search condition from the images captured by at least one camera, objects captured by other cameras at the same time may be replayed overlapping one another. Accordingly, the second identification information may also be indicated overlapping each object.

Figure 7:
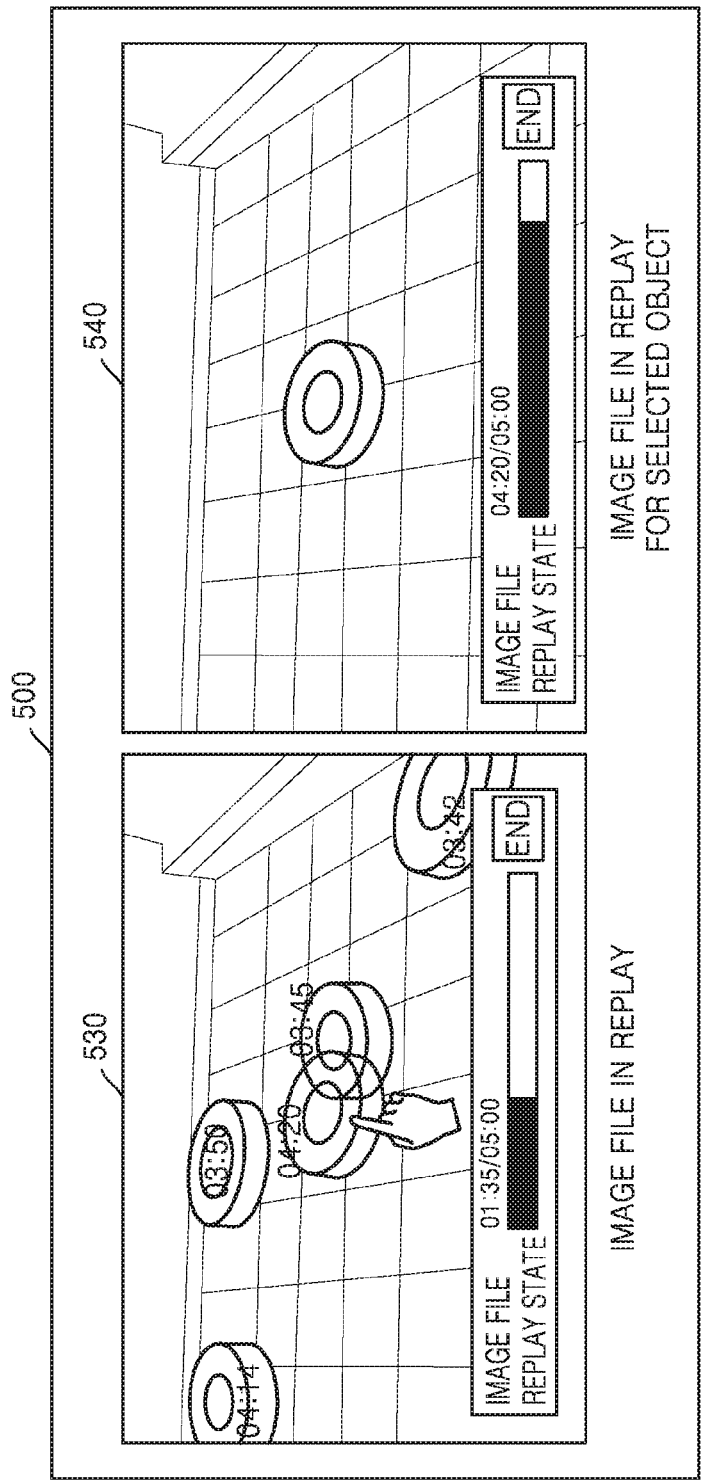
FIG. 7 illustrates a screen replaying an image file and an original image file, according to an embodiment.

FIG. 7 illustrates a screen replaying an image file and an original image file, according to an embodiment. Referring to FIG. 7, a left image illustrates an image file replayed in a first region 530 of the display device 500 with the second identification information. In this state, when a certain object is selected, an original image file in which the selected object is captured may be replayed in a second region 540, as illustrated in a right image.

As such, since a single image file is generated by extracting image frames for each camera satisfying a search condition from a storage device storing images captured by a plurality of cameras, a fast search for a desired object may be possible.

Figure 8:
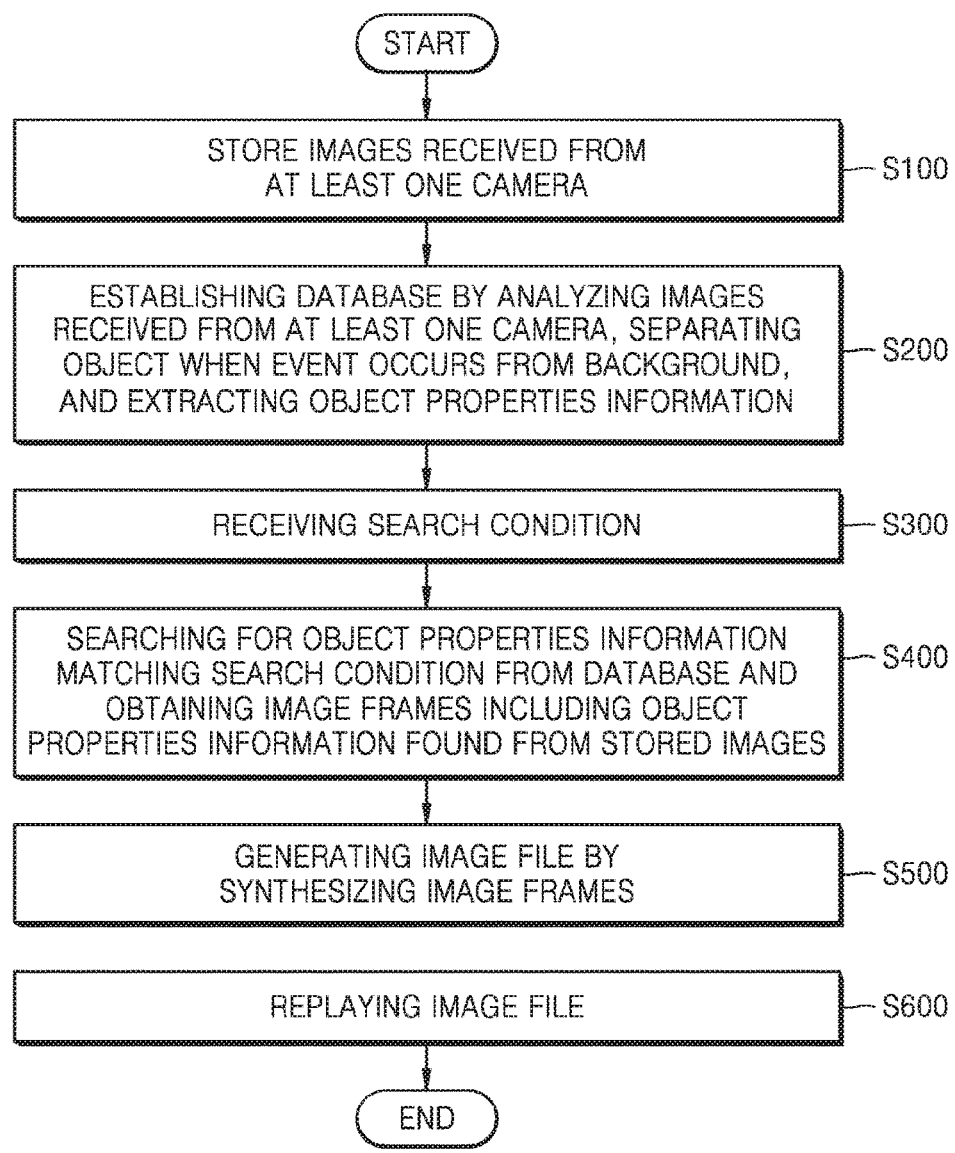
FIG. 8 is a flowchart of an image processing method according to an embodiment.

FIG. 8 is a flowchart of an image processing method according to an embodiment. The image processing method according to the present embodiment may be performed by the image processing device 400 with the help of peripheral elements as illustrated in FIGS. 1 and 2. In the following description, redundant descriptions to those of FIG. 1 to FIG. 7 are omitted.

Referring to FIG. 8, the image processing device 400 performs an operation (S100) of storing images received through at least one of cameras including the at least one of the network cameras 100 and the at least one of the analog cameras 200. The image processing device 400 stores an encoded stream of the images of the network cameras 100, without change, and encodes and stores the digitally converted images of the analog cameras 200. During storing of images, the images may be stored by classifying the images according to the camera that received each image, and the image receiving time. Also, the images may be an image input in real time or a previously stored image.

The image processing device 400 performs an operation (S200) of establishing a database by analyzing the images of the network cameras 100 and the digitally converted images of the analog cameras 200, separating an object, for which an event occurred, from a background, and extracting object properties information. Image analysis is performed by using an image analysis algorithm for analyzing object information with respect to the images of the network cameras 100 and the digitally converted images of the analog cameras 200. The image analysis is performed by determining occurrence of an event through detection of a movement from the image input from each camera, separating the object, for which an event occurred, from a background, and extracting the object classification information and the object attributes information from the object, for which an event occurred. The object classification information may information including a person, a vehicle, or an animal, for which a movement occurred. The object attributes information may be information including a color or size of an object, region information, a vehicle number, or characters. During the image analysis, when object classification information and object attributes information are extracted for each camera, that is, any one of the at least one of the network cameras 100 and the at least one of the analog cameras 200, identification (ID) information is assigned to the object, and a database is established by using the object classification information and object attributes information including the ID information, camera information, and object appearance time, etc.

Next, the image processing device 400 performs an operation (S300) of receiving a search condition input by a user. The search condition may be set by selecting at least one of camera setting, object setting, time setting, and region setting. The camera setting is a selection of at least one of the at least one of the network cameras 100 and the at least one of the analog cameras 200. When the camera selection is completed, the image processing device 400 receives only an image captured by the selected camera. Also, the object setting may be performed by using an input device such as a mouse or may be directly performed using a keyboard, while a displayed image is watched. For example, at least one of a person, a vehicle, or an animal may be set to be an object. Furthermore, during the object setting, an object including object attributes information may be set. For example, at least one of a yellow car, a person in red clothes, a car plate, and a particular character may be set. Also, the time setting may be setting of a time for image searching. For example, time setting by minutes, hours, days, months, or years may be possible. Furthermore, the region setting may be setting of at least one region for generating an image file by using an input device such as a mouse while a displayed image is watched.

When the search condition setting is completed, the image processing device 400 performs an operation (S400) of searching for object properties information matching a search condition from the database and obtaining image frames including the object properties information found from the stored images. In the obtaining of image frames, an image frame including the object properties information may be obtained among the I frames, the P frames, and the B frames included in the stored GOP. When an image frame including the object properties information is the P frame, the I frame is obtained together.

When the obtaining of image frames including the object properties information matching a search condition is completed, the image processing device 400 performs an operation (S500) of generating an image file. The generation of an image file may include generation of a single compressed image file. During the generation of an image file, the obtained image frames are arranged in an order of time and compressed into a single image file. Also, when image frames including the object properties information are obtained from at least one camera set to the same time, the image processing device 400 generates a compressed file by interleaving different image frames in a single image file. The image processing device 400 may set such that each compressed image frame includes the object capturing camera information and the time information, and the object properties information, that is, the object tag information. Also, the image processing device 400 may generate a single image file by synthesizing the obtained object images matching a search condition, and a certain background image including the obtained object image and compress the single image file.

When the generation of an image file is completed, the image processing device 400 performs an operation (S600) of replaying an image file. When an image file is replayed, a user may control replay, pause, forward replay, and reverse replay. Also, when a compressed image file is replayed, objects included in the replayed image frame are replayed overlapping one another. To identify the objects, the objects may be displayed with the first identification information such as a marker indicated outside each object. Also, an object may be selected from the replayed image file. When a certain object is selected, the second identification information including the object capturing camera information, the time information, and the object properties information may be displayed altogether. Also, when a certain object is selected from the replayed image file, an original image file in which the selected object is captured may be replayed in another region. In this state, a replay time of the original image file is moved to a time point when the selected object appears and thus the original image file may be replayed from the time point.

The inventive concept can also be embodied as computer readable codes on a computer readable recording medium. The computer readable recording medium is any data storage device that can store programs or data which can be thereafter read by a computer system.

Examples of the computer readable recording medium include read-only memory (ROM), random-access memory (RAM), CD-ROMs, magnetic tapes, hard disks, floppy disks, flash memory, optical data storage devices, and so on. Programs or code segments can be stored in processor readable media and can be transmitted via a computer data signal that is combined with a carrier wave in a transmission medium or in a communication network. The computer readable recording medium can also be distributed over network coupled computer systems so that the computer readable code is stored and executed in a distributive manner. Also, functional programs, codes, and code segments for accomplishing the present inventive concept can be easily construed by programmers skilled in the art to which the present inventive concept pertains.

As described above, according to the present inventive concept, since a single image file is created by extracting image frames for each camera satisfying a search condition from a storage storing images captured by at least one camera, a fast search for a desired object may be possible.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. An image processing apparatus comprising:
   a storage storing image frames received from at least one camera; and
   at least one processor configured to implement:
   an image analyzer detecting events by analyzing the image frames received from the at least one camera, extracting object properties information from objects related to the events, and storing the object properties information to a database;
   a search condition setter setting a search condition;
   a search engine searching the database for the object properties information matching the search condition, and obtaining image frames including the searched object properties information from the storage; and
   a file generator arranging the image frames obtained from the storage in an order of time and generating a single image file comprising the arranged image frames wherein the single image file is replayable as a video.

2. The image processing apparatus of claim 1, wherein the storage stores real-time image frames received from the at least one camera or previously stored images.

3. The image processing apparatus of claim 1, wherein the search condition setter comprises:
   a camera setter selecting the at least one camera;
   an object setter setting at least one of object properties information of an object appearing in an image captured by the at least one camera; and
   a time setter setting a time range when the object appears in the image captured by the at least one camera.

4. The image processing apparatus of claim 3, wherein the at least one processor is further configured to implement a region setter setting at least one region where the object appears in the image captured by the at least one camera.

5. The image processing apparatus of claim 1, wherein the search engine obtains the image frames including the searched object properties information among image frames included in a group of pictures (GOP) stored in the storage, and when an image frame including the searched object properties information is a predicted (P) frame, an intra (I) frame is obtained together with the P frame.

6. The image processing apparatus of claim 1, wherein the file generator generates a compressed image file by compressing the arranged image frames.

7. The image processing apparatus of claim 1, wherein the search engine searches the database for the object properties information matching the search condition, and obtains object images including the searched object properties information from the storage.

8. The image processing apparatus of claim 7, wherein the file generator synthesizes the object images and a background image including the object images from the storage and generates the single image file.

9. The image processing apparatus of claim 1, wherein the at least one processor is further configured to implement a replayer replaying the single image file.

10. The image processing apparatus of claim 9, wherein the replayer displays object identification information to identify each of a plurality of objects displayed during replaying of the single image file.

11. The image processing apparatus of claim 10, wherein, when an object of the plurality of objects is selected, the replayer extracts an original image of the object from the storage and replays the extracted original image in another region.

12. The image processing apparatus of claim 1, wherein the file generator interleaves image frames obtained at the same time.

13. The image processing apparatus of claim 1, wherein the file generator converts resolutions of the image frames obtained from the storage to the same resolution.

14. A method of processing an image, the method comprising:
   storing image frames received from at least one camera to a storage;
   detecting events by analyzing the image frames received from the at least one camera, and extracting object properties information from objects related to the events;
   establishing a database with the object properties information extracted with respect to each of the at least one camera;
   setting a search condition;
   searching the database for the object properties information matching the search condition, and obtaining image frames including the searched object properties information from the stored images; and
   arranging the image frames obtained from the storage in an order of time and generating a single image file comprising the arranged image frames,
   wherein the single image file is replayable as a video.

15. The method of claim 14, wherein the setting of the search condition comprises:
   selecting the at least one camera;
   setting at least one of object properties information appearing in an image captured by the at least one camera;
   setting a time range when an object appears in the image captured by the at least one camera; and
   setting at least one region where the object appears in the image captured by the at least one camera.

16. The method of claim 14, wherein the searching for the object properties information and the obtaining of the image frames comprises searching the database for the object properties information matching the search condition, and obtaining object images including the searched object properties information from the storage.

17. The method of claim 16, wherein the generating of the single image file comprises synthesizing the object images and a background image including the object images from the storage, and generating the single image file.

18. The method of claim 14, further comprising replaying the single image file,
   wherein the replaying of the single image file comprises displaying object identification information to identify each of a plurality of objects displayed during replay of the single image file.

19. The method of claim 18, wherein the replaying of the single image file further comprises, when an object of the plurality of objects is selected, extracting an original image of the object from the storage and replaying the extracted original image in another region.

20. The method of claim 14, wherein the generating of the single image file comprises interleaving image frames obtained at the same time.

21. The method of claim 14, wherein the generating of the single image file comprises converting resolutions of the image frames obtained from the storage to the same resolution.

22. The method of claim 14, wherein the obtaining image frames including the searched object properties information comprises obtaining the image frames including the searched object properties information among image frames included in a group of pictures (GOP) stored in the storage, and wherein, when an image frame including the searched object properties information is a predicted (P) frame, an intra (I) frame is obtained together with the P frame.

\* \* \* \* \*